US010429262B2

(12) United States Patent
Drews et al.

(10) Patent No.: US 10,429,262 B2
(45) Date of Patent: Oct. 1, 2019

(54) PROTECTIVE CASINGS FOR GAUGE ASSEMBLIES HAVING GAUGES AND HOSES

(71) Applicant: Gauge Guardian, LLC, Kaukauna, WI (US)

(72) Inventors: Russell Drews, Kaukauna, WI (US); Cathy L. Drews, Kaukauna, WI (US)

(73) Assignee: Gauge Guardian, LLC, Kaukauna, WI (US)

( * ) Notice: Subject to any disclaimer, the term of this patent is extended or adjusted under 35 U.S.C. 154(b) by 116 days.

(21) Appl. No.: 15/654,221

(22) Filed: Jul. 19, 2017

(65) Prior Publication Data
US 2019/0025147 A1 Jan. 24, 2019

(51) Int. Cl.
B65D 85/38 (2006.01)
G01L 19/14 (2006.01)

(52) U.S. Cl.
CPC .................................. G01L 19/14 (2013.01)

(58) Field of Classification Search
CPC .......... G01L 19/14; B65D 85/38; G01D 11/24
USPC ........... 206/305, 306, 320, 806; 73/201, 431
See application file for complete search history.

(56) References Cited

U.S. PATENT DOCUMENTS

| | | | | |
|---|---|---|---|---|
| 2,122,003 A | * | 6/1938 | Cooper | F41A 9/84 206/3 |
| 2,144,523 A | * | 1/1939 | Brown | G01D 11/24 206/305 |
| 3,956,701 A | * | 5/1976 | James, Jr. | G08B 3/1058 343/702 |
| D250,241 S | * | 11/1978 | Braginetz | D19/90 |
| D280,466 S | * | 9/1985 | Seltzer | D12/422 |
| 4,598,027 A | * | 7/1986 | Johnson | A45F 5/02 156/212 |
| 4,735,313 A | * | 4/1988 | Schoenberg | B65D 71/0003 206/427 |
| 4,779,745 A | * | 10/1988 | Prendergast | A47F 1/08 211/59.2 |
| D348,229 S | | 6/1994 | Assaly | |
| 6,029,871 A | * | 2/2000 | Park | A45F 5/02 224/197 |
| 7,641,046 B2 | * | 1/2010 | Tsang | A45C 11/18 206/305 |
| 8,459,107 B1 | | 6/2013 | Michaud | |

* cited by examiner

Primary Examiner — Luan K Bui
(74) Attorney, Agent, or Firm — Andrus Intellectual Property Law, LLP

(57) ABSTRACT

A protective casing is for a receiving and protecting a manifold gauge assembly having a gauge and a hose. The protective casing has a base member with a first end and an opposite, second end and a pair of opposing side members extending from the base member in a first direction such that the base member and the side members define a cavity. The side members define a channel through which the hose passes into a cavity such that hose is received in the cavity and the gauge is positioned at the first end.

12 Claims, 5 Drawing Sheets

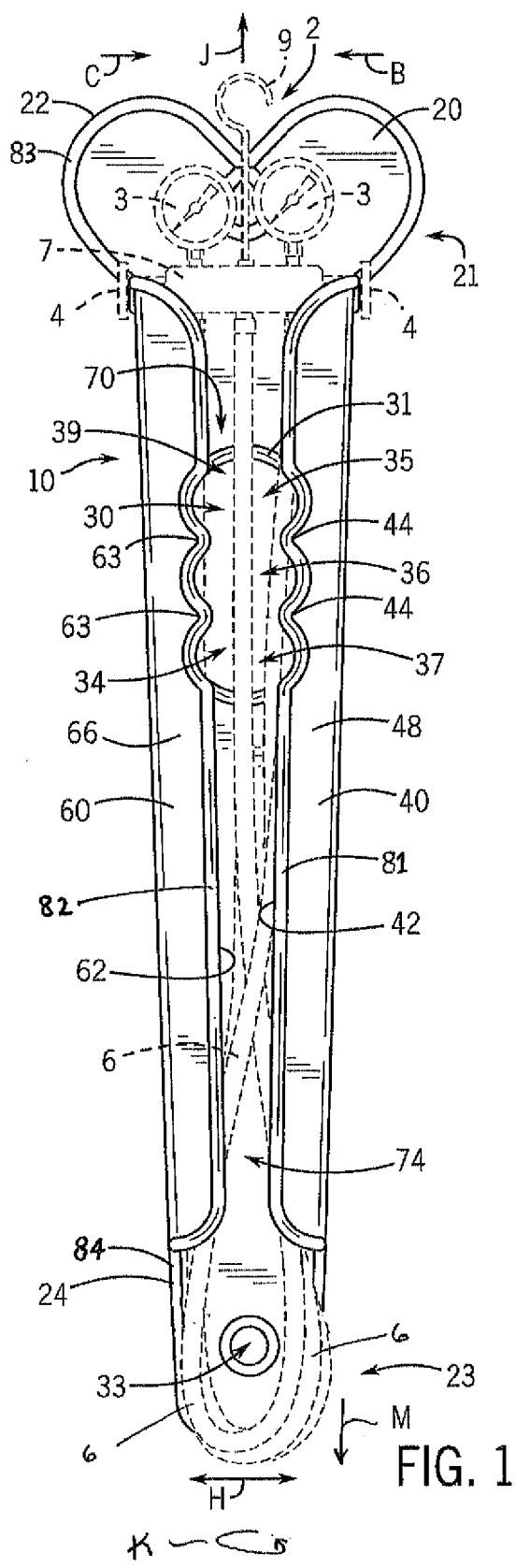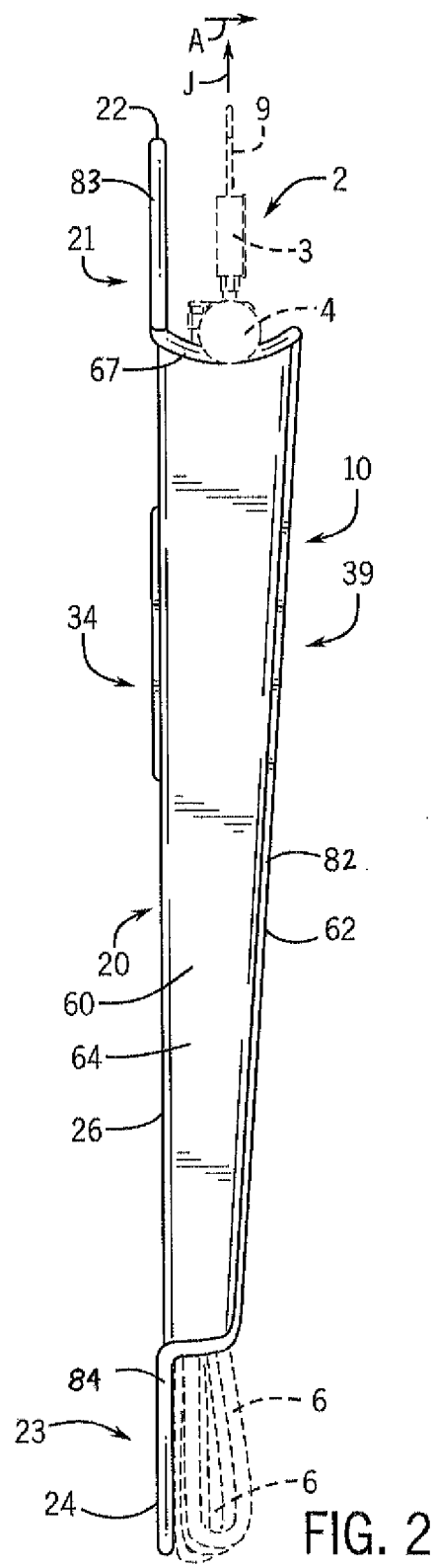
FIG. 1
FIG. 2

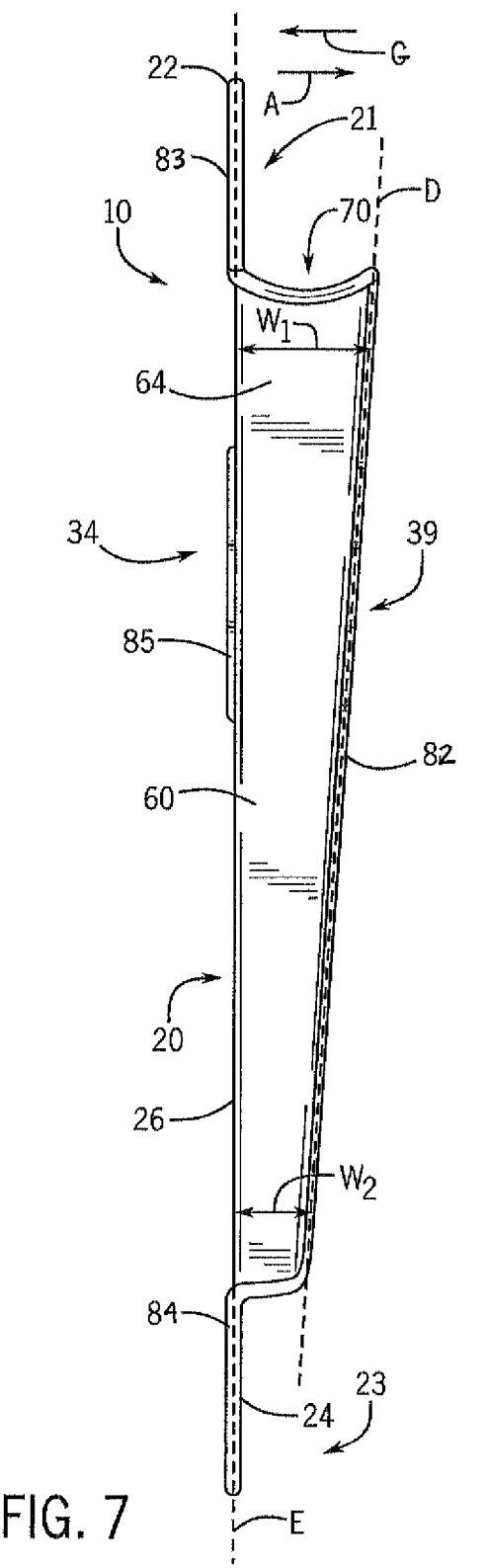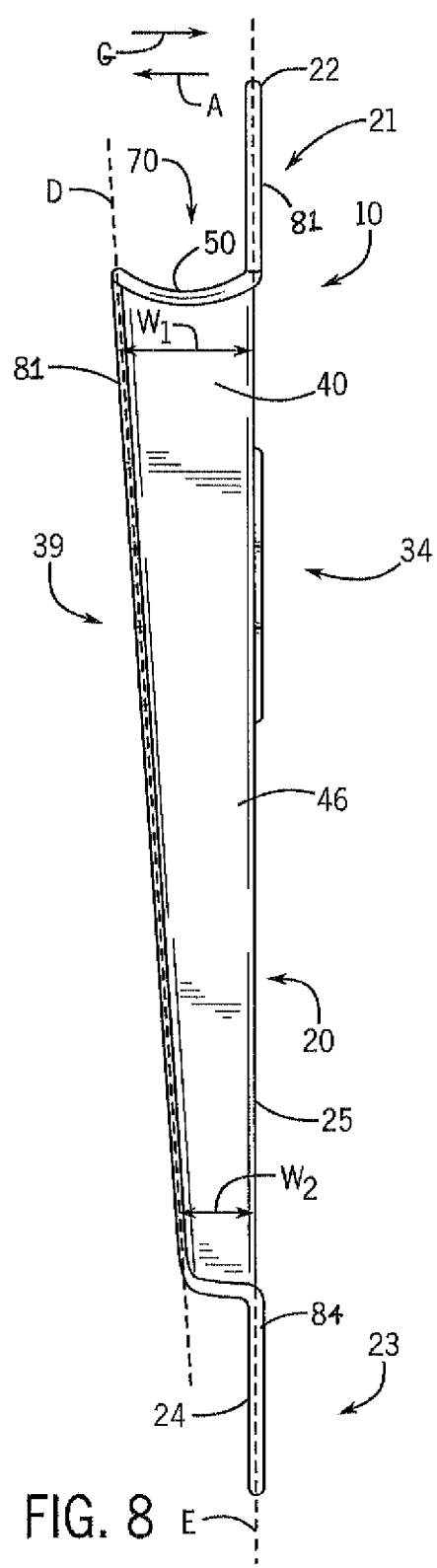

PROTECTIVE CASINGS FOR GAUGE ASSEMBLIES HAVING GAUGES AND HOSES

FIELD

The present disclosure relates to protective casings for gauge assemblies having gauges and hoses.

BACKGROUND

The following U.S. Patents is incorporated herein by reference in entirety.

U.S. Pat. No. 8,459,107 discloses a manifold gauge cover featuring a first half shell and a second half shell connected via a hinge. The inner surfaces of the shells are lined with foam. The shells can move between an open position and a closed position respectively allowing and preventing access to the inner cavities of the shells.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples disclosed herein, a protective casing is for receiving and protecting a manifold gauge assembly having a gauge and a hose. The protective casing has a base member with a first end and an opposite second end and a pair of opposing side members extending from the base member in a first direction such that the base member and the side members define a cavity. The side members define a channel through which the hose passes into a cavity such that hose is received in the cavity and the gauge is positioned at the first end.

In certain examples disclosed herein, the protective casing has a base member with a first end and an opposite second end, a first side member, and a second side member. The first side member has a first panel extending in the first direction from the base member, a second panel extending transverse to the first panel in a second direction, and a first side edge. The second side member has a third panel extending in the first direction from the base member, a fourth panel extending transverse to the third panel in a third direction opposite the second direction, and a second side edge. The base member, the first side member, and the second side member define a cavity, and the first side edge and the second side edge define a channel through which the hose passes into a cavity such that hose is received in the cavity and the gauge is positioned at the first end.

In certain examples disclosed herein, the protective casing has a base member having a first end and an opposite second end, a first side member, and a second side member. The first side member has a first panel extending in the first direction from the base member, a second panel extending transverse to the first panel in a second direction, and a first side edge. The second side member has a third panel extending in the first direction from the base member, a fourth panel extending transverse to the third panel in a third direction opposite the second direction, and a second side edge. The base member, the first side member, and the second side member define a cavity, and the first side edge and the second side edge define a channel through which the hose passes into a cavity such that hose is received in the cavity and the gauge is positioned at the first end. The first, second, third, and fourth panels each have a first width and a second width spaced apart from the first width. The first widths are nearer the first end of the base member than the second widths, and first widths are larger than the second widths. The cavity is shaped as a truncated rectangular pyramid.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 1 is a front view of an example protective casing with an example gauge assembly depicted in dashed lines.

FIG. 2 is a first side view of the example projective casing of FIG. 1 with the example gauge assembly depicted in dashed lines.

FIG. 7 is a first side view like FIG. 3.

FIG. 8 is a second side view like FIG. 3.

DETAILED DESCRIPTION

Figures 3, 4:
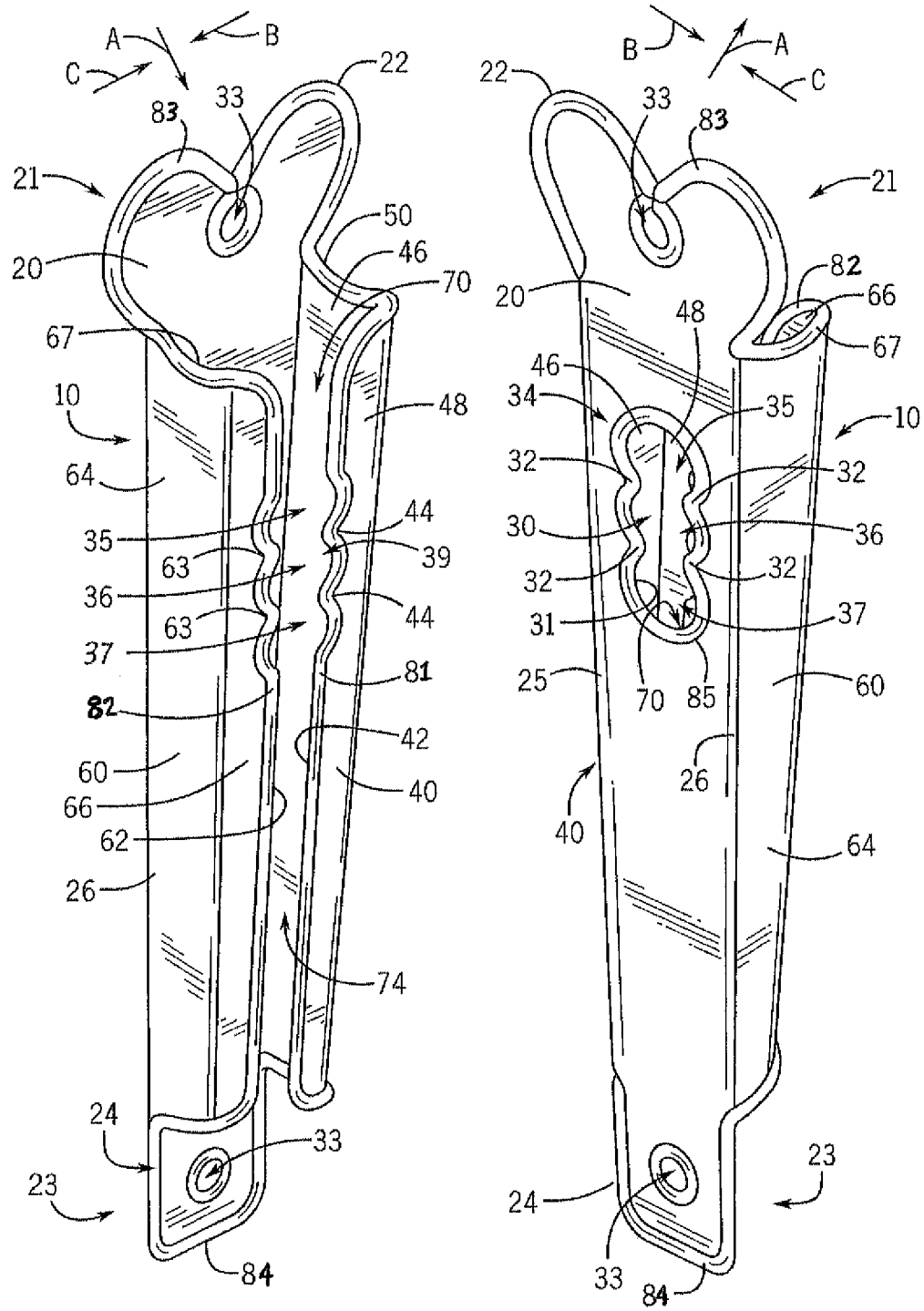
FIG. 3 is a front perspective view of the example protective casing without the example gauge assembly.
FIG. 4 is a rear perspective view like FIG. 3.

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

Referring to FIGS. 1-2 a conventional manifold gauge assembly 2 (shown in dashed lines) is depicted received in and/or retained by an example protective casing 10 of the present disclosure. The gauge assembly 2 may be a device used by a technician for diagnosing and servicing a refrigeration or HVAC system. Other common names for the gauge assembly 2 are a two-valve manifold gauge set, a HVAC gauge manifold, a refrigeration gauge set, or an AC manifold gauge set. The depicted example gauge assembly 2 may include one, two, or more gauges 3 coupled to a manifold body 7 defining an internal pressure chamber (not shown). Each gauge 3 has a valve 4 and a hose 6. The gauge assembly 2 may include a hook 9 that facilitates hanging of the gauge assembly 2, i.e. the hook 9 allows the technician to hang the gauge assembly 2 from an object during use. A person having ordinary skill will recognize that the type and number of components included with the gauge assembly 2 can vary.

It is common for technicians to carry the gauge assembly 2 with them during the workday, and as such, the technician must avoid damaging the gauge assembly 2. For example, the gauge assembly 2 may be damaged by bumping the gauge assembly 2 on objects, dropping gauge assembly 2, and/or snagging the hoses 6 on an object. In addition, at the end of the workday or when the gauge assembly 2 is not in use, the technician often stores the gauge assembly 2 in a workbox or worktruck. During these times, the gauge assembly 2 must be protected from damage and entanglement. In recognition of these problems, the present inventor has endeavored, through research and experimentation, to develop the protective casings 10 of the present disclosure that protect and retain the gauge assembly 2 while allowing the technician to easily and quickly insert and remove the gauge assembly 2 from the protective casing 10.

Referring to FIGS. 3-8, various views of the example protective casing 10 of FIGS. 1-2 are shown. The protective casing 10 includes a base plate or member 20 having an open first end 21 with a first perimetral edge 22 and an opposite, open second end 23 with a second perimetral edge 24. The first end 21 is shaped to be larger than the gauge(s) 3 of the gauge assembly 2 such that the first end 21 extends beyond the outer perimeter of the gauge(s) 3 to protect the gauge(s) 3, e.g. the first end 21 includes two circular projections that extend perpendicular relative to each other and are larger than the gauge(s) 3. The base member 20 also has a third perimetral edge 25 and a fourth perimetral edge 26 that extend between the ends 21, 23 and connect, i.e. abut, with the first and second perimetral edges 22, 24. In certain examples, the base member 20 includes a lip (not shown) that is connected to the first perimetral edge 22 to thereby further protect the gauge assembly 2 and retain the gauge assembly 2 in the protective casing 10, i.e. the lip prevents the gauge assembly 2 from sliding past first end 21 in a direction from the second end 23 to the first end 21.

Figures 5, 6:
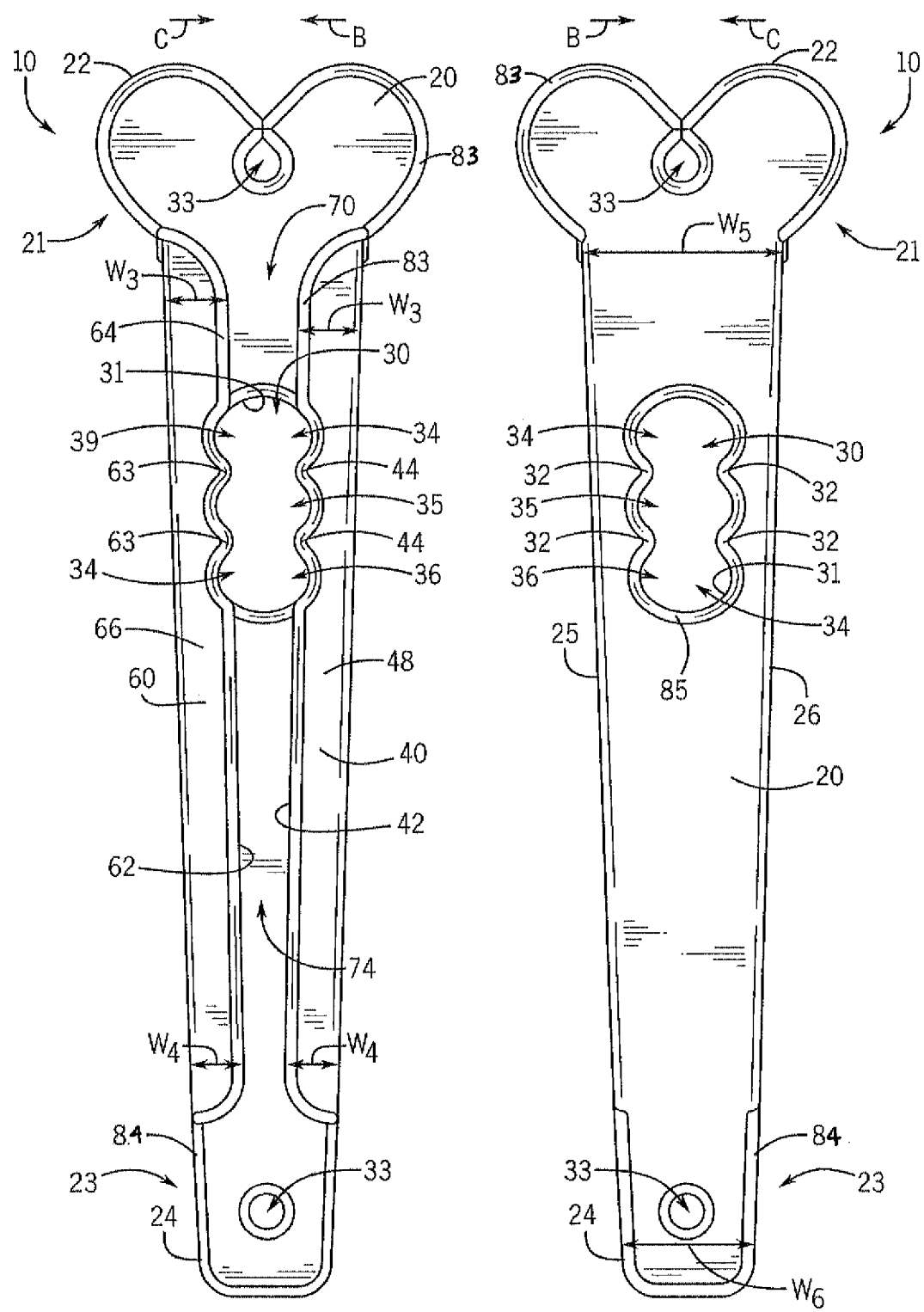
FIG. 5 is a front view like FIG. 3.
FIG. 6 is a back view like FIG. 3.
Figure 9:
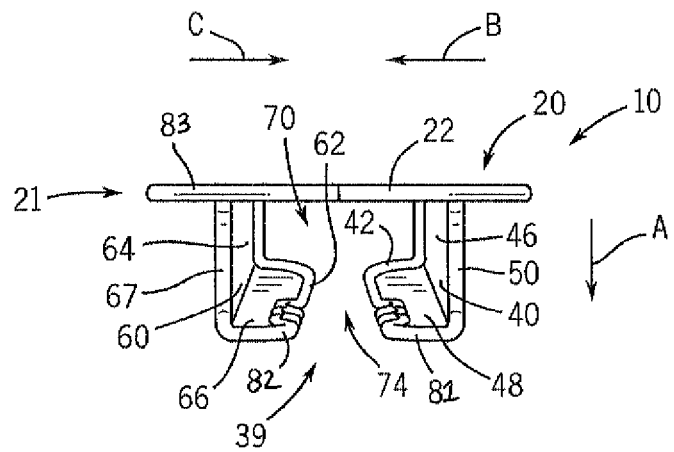
FIG. 9 is a top view like FIG. 3.
Figure 10:
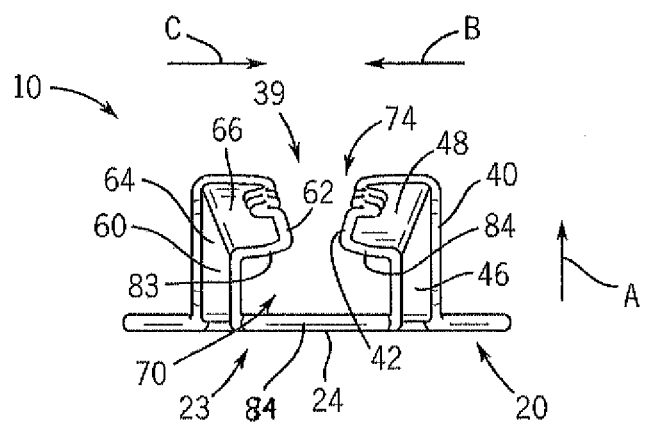
FIG. 10 is a bottom view like FIG. 3.

Referring to FIGS. 4 and 6, the base member 20 has an inner edge 31 and an aperture 30 that is configured to receive fingers of the technician such that the protective casing 10 can be easily grasped, i.e. the aperture 30 forms a first handle 34 that can be easily grasped by the technician as the technician carries the protective casing 10. The inner edge 31 has two sets of opposing base member ridges 32 that extend into the aperture 30 to thereby define a plurality of ergonomic finger sections 35, 36, 37 of the aperture 30. That is, the base member ridges 32 divide the aperture 30 into multiple finger sections 35, 36, 37 that can receive the fingers of the technician. The base member 20 optionally defines hole(s) 33 that facilitate mounting or hanging of the protective casing 10 from an object, e.g. nail, peg, screw, rod.

An opposing pair of side members, namely a first side member 40 and a second side member 60, are connected to and extend from the base member 20 in a first direction A. The side members 40, 60 and the base member define or form a cavity 70 in which the hose(s) 6 of the gauge assembly can be received and retained (see also FIG. 1). In addition, the side members 40, 60 define a channel 74 through which the hose(s) 6 pass into the cavity 70. In use, the technician positions the gauge assembly 2 adjacent to the base member 20, maneuvers, i.e. twists, the hose(s) 6 into the cavity 70, and then pulls the hose(s) 6 toward the second end 23 (see direction arrow M on FIG. 1). As such, the gauge(s) 3 are positioned at the first end 21 of the base member 20 such that the manifold body 7 and/or the valves 4 rest on the concave edges 50, 67 (FIG. 3-4) and the hose(s) 6 are received, retained, and/or contained in the cavity 70. The side members 40, 60 confine the hose(s) 6 and prevent the hoses(s) 6 from moving outwardly or expanding due to the material properties of the hose(s) 6 (see direction arrow H on FIG. 1). To remove the gauge assembly 2 from the protective casing 10, the technician twists the hose(s) 6 at either the second end 23 or the second perimetral edge 24 (see direction arrow K, note that the hose(s) 6 can be twisted in any suitable direction) such that the hose(s) 6 move into the channel 74. The technician then pulls the gauge(s) 3 away from the first end 21 (see direction arrow J on FIGS. 1-2) such that the hose(s) 6 slide through the channel 74 and/or cavity 70 near the first end 21 of the base member 20 and away from the protective casing 10.

The side members 40, 60 are exemplarily constructed of panels of materials. In particular, the first side member 40 has a first panel 46 that is connected to the third perimetral edge 25 of the base member 20 and extends in the first direction A away from the base member 20. A second panel 48 is connected to the first panel 46 and extends in a second direction B such that the second panel 48 is transverse to the first panel 46. The second panel 48 has a first side edge 42 that at least partially defines the channel 74. The first side edge 42 also has side ridges 44 that extend into the channel 74 and correspond and/or align with the base member ridges 32.

The second side member 60 has a third panel 64 that is connected to the fourth perimetral edge 26 of the base member 20 and extends in the first direction A from the base member 20. A fourth panel 66 is connected to the third panel 64 and extends in a third direction C such that the fourth panel 66 is transverse to the third panel 64. The fourth panel 66 has a second side edge 62 that at least partially defines the channel 74. The second side edge 62 also has side ridges 63 that extend into the channel 74 and correspond and/or align with the base member ridges 32 such that the channel 74, which is defined by the first side edge 42 and the second side edge 62, forms a second handle 39 that aligns with the first handle 34. The operator grasps the protective casing 10 by inserting their fingers through the first handle 34, the cavity 70, and the second handle 39. The second and fourth panels 48, 66 extend in the same first plane D (FIGS. 7-8), and the base member 20 extends in a second plane E (FIGS. 7-8) that is transverse to the first plane D.

The first and second side edges 42, 62 each have a concave edge 50, 67 that is configured to support and cradle the gauge(s) 3 between the base member 20 and the second and fourth panels 48, 66 when the gauge assembly 2 is received in the protective casing 10. That is, when the gauge assembly 2 is received in the protective casing, the gauge(s) 3 rest on the concave edges 50, 67. The concave edges 50, 67 prevent the gauge assembly 2 from slipping or falling through the cavity 70 and/or out past the second end 23 of the base member 20 (see FIGS. 1-2).

It should be noted that the size, shape, and/or orientation of the base member 20, the side members 40, 60, and the components thereof can vary. Furthermore, the base member 20 and the side members 40, 60 can be connected to each other by any suitable connection including but not limited to welding, mechanical fasteners, and adhesive. In one specific example, the base member 20 and the side members 40, 60 may be formed by bending a single sheet of material into the desired shape, i.e. the base member 20 and the side members 40, 60 may be integral to each other and the single sheet of material is folded to form the desired shape of the side members 40, 60. In another example, the protective casing 10 is injection molded. The materials used to form or construct the protective casing 10 can also vary (e.g. metal, non-conductive materials, non-corrosive materials, plastic, rubber).

Several components of the protective casing 10 (described above) taper to thereby retain the hose(s) 6 in the cavity 70. In particular, widths W1 of the first and third panels 46, 64 near the first end 21 are larger than widths W2 of the first and third panels 46, 64 near the second end 23, i.e. the first panel 46 and the third panel 64 taper from the first end 21 to the second end 23 toward the base member 20 in a fourth direction G which is opposite the first direction A (see FIGS. 7-8). Additionally, widths W3 of the second and fourth panels 48, 66 near the first end 21 are larger than widths W4 of the second and fourth panels 48, 66 near the second end 23. That is, the second panel 48 tapers from the first end 21 toward the second end 23 in the third direction C, and the fourth panel 66 tapers from the first end 21 toward the second end 23 in the second direction B (see FIG. 5). Furthermore, the base member 20 tapers from the first end 21 toward the second end 23, i.e. width W5 of the base member 20 at the first end 21 is larger than width W6 of the base member 20 at the second end 23 (see FIG. 6). The tapered components of the protective casing 10 (described above) also permit a second protective casing 10 to be nested in the protective casing 10 for storage and shipping purposes. A person having ordinary skill in the art will appreciate the second end 12 of a second protective casing (not shown) can be slid into the cavity 70 of a first protective casing 10 until the base members 20 and side members 40, 60 of the respective first and second protective casings 10 contact each other. More than two protective casings 10 can be nested together.

The protective casing 10 can include trim members at the edges of the base member 20 and/or side members 40, 60 to reinforce or stiffen the base member 20 and/or side members 40, 60. The trim members can also prevent damage to the hose(s) 6 as the hose(s) 6 are inserted into the cavity, i.e. the trim members prevent the edges from cutting or tearing the hose(s) 6. Specifically, a first trim member 81 extends along the first side edge 42 to thereby stiffen and reinforce the first side member 40, and a second trim member 82 extends along the second side edge 62 to thereby stiffen and reinforce the second side member 60. A third trim member 83 extends along the first perimetral edge 22 to thereby stiffen the first end 21 of the base member 20, and a fourth trim member 84 extends along the second perimetral edge 24 to thereby stiffen the second end 23 of the base member 20. A fifth member 85 extends along the inner edge 31 of the base member 20 to thereby stiffen and reinforce the base member 20. The shape and size of the trim members can vary. For example, the trim members can be a flat and adhered to a surface of the protective casing 10. In another example, the trim members are "U"-shaped such that the trim members clamp to the protective casing 10 to thereby cover the edge. In other examples, the trim members are welds of material or integral ridges.

What is claimed is:

1. A protective casing for a manifold gauge assembly having a gauge and a hose, the protective casing comprising:
    a base member having a first end and an opposite, second end; and
    a pair of opposing side members that each extend from the base member in a first direction such that the base member and the pair of opposing side members define a cavity, and wherein the pair of opposing side members define a channel through which the hose passes into the cavity such that the hose is received in the cavity and the gauge is positioned at the first end;
    wherein the base member has an aperture that aligns with the channel to thereby form a handle, and wherein the aperture is defined by an inner edge having a base member ridge that divides the aperture into a first finger section and a second finger section; and
    wherein one side member in the pair of opposing side members has a first side edge with a first side ridge that aligns with the base member ridge.

2. The protective casing according to claim 1, wherein the pair of opposing side members has a first side member and a second side member;
    wherein the first side member has a first panel extending in the first direction from the base member, a second panel extending transverse to the first panel in a second direction, and the first side edge that partially defines the channel; and
    wherein the second side member has a third panel extending in the first direction from the base member, a fourth panel extending transverse to the third panel in a third direction opposite the second direction, and a second side edge that partially defines the channel.

3. The protective casing according to claim 2, wherein the second panel and the fourth panel extend in a first plane.

4. The protective casing according to claim 3, wherein the base member extends in a second plane that is transverse to the first plane.

5. The protective casing according to claim 2, wherein the first side edge has a first concave edge configured to support and cradle the gauge, and wherein the second side edge has a second concave edge configured to support and cradle the gauge.

6. The protective casing according to claim 2, wherein the first, second, third, and fourth panels are tapered.

7. The protective casing according to claim 6, wherein the first, second, third, and fourth panels each have a first width and a second width spaced apart from the first width;
    wherein the first widths are nearer the first end of the base member than the second widths;
    wherein the first widths are greater than the second widths; and
    wherein the cavity is shaped as a truncated rectangular pyramid.

8. The protective casing according to claim 6, wherein the base member is tapered.

9. The protective casing according to claim 2, further comprising:
    a first trim member that extends along the first side edge to thereby stiffen the first side member; and
    a second trim member that extends along the second side edge to thereby stiffen the second side member.

10. The protective casing according to claim 9, wherein the first end has an first perimetral edge and the second end has a second perimetral edge, and further comprising:
    a third trim member extending along the first perimetral edge to thereby stiffen the first end of the base member; and
    a fourth trim member extending along the second perimetral edge to thereby stiffen the second end of the base member.

11. A protective casing for a manifold gauge assembly having a gauge and a hose, the protective casing comprising:
    a base member having a first end and an opposite, second end;
    a first side member having a first panel extending in the first direction from the base member, a second panel extending transverse to the first panel in a second direction, and a first side edge; and
    an opposing, second side member having a third panel extending in the first direction from the base member, a fourth panel extending transverse to the third panel in a third direction opposite the second direction, and a second side edge;
    wherein the base member, the first side member, and the second side member define a cavity;

wherein the first side edge and the second side edge define a channel through which the hose passes into the cavity such that the hose is received in the cavity and the gauge is positioned at the first end;
wherein the base member has an aperture that aligns with the channel to form a handle;
wherein the aperture is defined by an inner edge having a base member ridge that divides the aperture into a first finger section and a second finger section; and
wherein the first side edge has a first side ridge that aligns with the base member ridge.

12. The protective casing according to claim 11, wherein the second panel and the fourth panel extend in a first plane, and wherein the base member extends in a second plane that is transverse to the first plane.

\* \* \* \* \*